(12) United States Patent
Massari et al.

(10) Patent No.: US 10,316,122 B2
(45) Date of Patent: Jun. 11, 2019

(54) HETEROPHASIC PROPYLENE COPOLYMERS

(71) Applicant: BASELL POLIOLEFINE ITALIA S.R.L., Milan (IT)

(72) Inventors: Paola Massari, Ferrara (IT); Caroline Cathelin, Ferrara (IT); Giampiero Morini, Ferrara (IT); Fabrizio Piemontesi, Ferrara (IT); Gianni Vitale, Ferrara (IT); Marco Ciarafoni, Ferrara (IT); Claudio Cavalieri, Ferrara (IT); Roberto Pantaleoni, Ferrara (IT); Michele Grazzi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/768,875

(22) PCT Filed: Oct. 25, 2016

(86) PCT No.: PCT/EP2016/075684
§ 371 (c)(1),
(2) Date: Apr. 17, 2018

(87) PCT Pub. No.: WO2017/076701
PCT Pub. Date: May 11, 2017

(65) Prior Publication Data
US 2019/0055333 A1 Feb. 21, 2019

(30) Foreign Application Priority Data

Nov. 5, 2015 (EP) .................................. 15193228

(51) Int. Cl.
*C08F 210/06* (2006.01)
*C08L 23/12* (2006.01)
*C08L 23/16* (2006.01)
*C08F 10/06* (2006.01)
*C08F 2/00* (2006.01)
*C08F 4/657* (2006.01)
*C08F 4/659* (2006.01)

(52) U.S. Cl.
CPC ............ *C08F 210/06* (2013.01); *C08F 2/001* (2013.01); *C08F 4/6574* (2013.01); *C08F 4/65912* (2013.01); *C08L 23/12* (2013.01); *C08L 23/16* (2013.01); *C08F 2500/12* (2013.01); *C08F 2500/17* (2013.01); *C08L 2207/02* (2013.01); *C08L 2308/00* (2013.01)

(58) Field of Classification Search
CPC ...... C08F 2/001; C08F 210/06; C08F 210/16; C08F 4/651; C08F 2500/12; C08F 2500/17; C08L 23/12; C08L 23/14; C08L 23/16; C08L 23/0815; C08L 23/13; C08L 2205/02; C08L 2666/06
USPC .......................................................... 526/79
See application file for complete search history.

(56) References Cited

FOREIGN PATENT DOCUMENTS

| EP | 2781548 A1 | 9/2014 |
|---|---|---|
| WO | 2012049204 A1 | 4/2012 |
| WO | WO 2012/049204 A1 * | 4/2012 |

OTHER PUBLICATIONS

International Search Report and Written Opinion dated Jan. 19, 2017 (Jan. 19, 2017) for Corresponding PCT/EP2016/075684.

* cited by examiner

*Primary Examiner* — William K Cheung

(57) ABSTRACT

A polypropylene composition made from or containing:
A) from 50 wt % to 90 wt %; of a propylene homopolymer;
B) from 10 wt % to 50 wt %; of a copolymer of propylene having from 30.0 wt % to 70.0 wt %, of ethylene derived units, based upon the total weight of the copolymer;
the sum of the amount of component A) and B) being 100;
the polypropylene composition having:
i) an intrinsic viscosity of the fraction soluble in xylene at 25° C. between 2.2 to 4.0 dl/g;
ii) a MFR L (Melt Flow Rate according to ISO 1133, condition L, at 230° C. and 2.16 kg load) from 0.5 to 100 g/10 min;
iii) a xylene soluble fraction ranging from 20 wt % to 50 wt %, based upon the total weight of the polypropylene composition;
wherein the polypropylene composition being obtained by a polymerization process wherein the catalyst system contains bismuth.

6 Claims, No Drawings

HETEROPHASIC PROPYLENE COPOLYMERS

This application is the U.S. National Phase of PCT International Application PCT/EP2016/075684, filed Oct. 25, 2016, claiming benefit of priority to European Patent Application No. 15193228.2, filed Nov. 5, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to an heterophasic propylene copolymer having a low content of oligomer and automotive elements made therefrom.

BACKGROUND OF THE INVENTION

Polypropylene is the material of choice for many applications. Some polypropylene compositions provide good processable and can be individually customized. Some polypropylene compositions have limited utility for automotive interior because the resulting elements can be malodor and fogging.

SUMMARY OF THE INVENTION

In a general embodiment, the present disclosure provides a polypropylene composition made from or containing:

A) from about 50 wt % to about 90 wt %, of a propylene homopolymer having a fraction insoluble in xylene at 25° C., higher than about 90%, and a MFR L (Melt Flow Rate according to ISO 1133, condition L, at 230° C. and 2.16 kg load) from about 0.5 to about 200 g/10 min;

B) from about 10 wt % to about 50 wt %; of a copolymer of propylene and ethylene having from about 30.0 wt % to about 70.0 wt %, of ethylene derived units, based upon the total weight of the copolymer;

the sum of the amount of component A) and B) being 100;
the polypropylene composition having:
i) an intrinsic viscosity of the fraction soluble in xylene at 25° C. between about 2.2 to about 4.0 dl/g;
ii) a MFR L (Melt Flow Rate according to ISO 1133, condition L, at 230° C. and 2.16 kg load) from about 0.5 to about 100 g/10 min;
iii) a xylene soluble fraction ranging from about 20 wt % to about 50 wt %, based upon the total weight of the polypropylene composition;
wherein the polypropylene composition being obtained by a polymerization process including:
step a) polymerizing propylene to obtain component A) in the presence of a catalyst made from or containing the product of a reaction between:
a) a solid catalyst component made from or containing Ti, Mg, Cl, and an internal electron donor compound containing from about 0.1 to about 50% wt of Bi with respect to the total weight of the solid catalyst component;
b) an alkylaluminum compound and,
c) an electron-donor compound (external donor); and
step b) polymerizing propylene and ethylene to obtain component B) in the presence of the polymerization product of step a).

DETAILED DESCRIPTION OF THE INVENTION

In a general embodiment, the present disclosure provides a polypropylene composition made from or containing:

A) from about 50 wt % to about 90 wt %; alternatively from about 60 wt % to about 85 wt %; alternatively from about 67 wt % to about 82 wt %, of a propylene homopolymer having a fraction insoluble in xylene at 25° C., higher than about 90%, alternatively higher than about 95%, alternatively higher than about 97%; and a MFR L (Melt Flow Rate according to ISO 1133, condition L, at 230° C. and 2.16 kg load) from about 0.5 to about 200 g/10 min, alternatively from about 50 to about 150 g/10 min, alternatively from about 80 to about 140 g/10 min;

B) from about 10 wt % to about 50 wt %; alternatively from about 15 wt % to about 40 wt %; alternatively from about 18 wt % to about 33 wt %, %; of a copolymer of propylene and ethylene having from about 30.0 wt % to about 70.0 wt %, alternatively from about 35.0 wt % to about 60.0 wt %, alternatively from about 40.0 wt % to about 58.0 wt %, alternatively from about 45 wt % to about 55% of ethylene derived units, based upon the total weight of the copolymer;

the sum of the amount of component A) and B) being 100;
the polypropylene composition having:
i) an intrinsic viscosity of the fraction soluble in xylene at 25° C. between about 2.2 to about 4.0 dl/g; alternatively between about 2.5 to about 4.0 dl/g, alternatively between about 2.6 to about 3.5 dl/g;
ii) a MFR L (Melt Flow Rate according to ISO 1133, condition L, at 230° C. and 2.16 kg load) from about 0.5 to about 100 g/10 min, alternatively from about 8 to about 70 g/10 min, alternatively from about 10 to about 60 g/10 min;
iii) a xylene soluble fraction ranging from about 20 wt % to about 50 wt %; alternatively from about 25 wt % to about 35 wt %, based upon the total weight of the polypropylene composition;
wherein the polypropylene composition being obtained by a polymerization process including:
step a) polymerizing propylene to obtain component A) in the presence of a catalyst made from or containing the product of a reaction between:
a) a solid catalyst component made from or containing Ti, Mg, Cl, and an internal electron donor compound containing from about 0.1 to about 50% wt of Bi with respect to the total weight of the solid catalyst component;
b) an alkylaluminum compound and,
c) an electron-donor compound (external donor); and
step b) polymerizing propylene and ethylene to obtain component B) in the presence of the polymerization product of step A).

In the present description, the term "copolymer" includes polymers containing two kinds of comonomers.

In some embodiments, the polypropylene composition is used for automotive interior element.

In the present description, the term "automotive interior element" refers to any interior part of automotive, including, as examples, door handles, door pockets, trim and parcel shelves, air ducts, heater/air conditioning unit casings, armatures for fascia panels, center consoles, and carpeting.

In some embodiments, the oligomer content of the polypropylene composition to be used for interior automotive element of the present disclosure is, measured in the ex-reactor polymer, lower than about 2000 ppm; alternatively lower than about 1500 ppm.

In some embodiments, the Flexural Modulus of the polypropylene composition is between about 900 MPa to about 1700 MPa, alternatively between about 1100 to about 1600 MPa;

In some embodiments, the Izod impact strength of the polypropylene composition measured at 23° C. is higher than about 5 kJ/m$^2$; alternatively between about 5.2 to about 20 kJ/m$^2$;

In some embodiments, the Izod impact strength of the polypropylene composition measured at 0° C. is higher than about 4.7 kJ/m$^2$; alternatively between about 5 to about 20 kJ/m$^2$; alternatively between about 5.1 to about 12 KJ/m$^2$; alternatively between about 5.3 to about 10 KJ/m$^2$;

In some embodiments, the Izod impact strength measured at −20° C. is higher than about 3.8 KJ/m$^2$; alternatively between about 4.0 to about 10 KJ/m$^2$;

In some embodiments, the present disclosure provides an automotive interior made from or containing the polypropylene composition.

In some embodiments, the polyolefin composition is prepared by a process including homopolymerizing propylene in a first stage and then copolymerizing propylene with ethylene in a second stage, wherein both stages occur in the presence of a catalyst made from or containing the product of a reaction between:

a) a solid catalyst component made from or containing Ti, Mg, Cl, and an electron donor compound containing from about 0.1 to about 50% wt of Bi with respect to the total weight of the solid catalyst component;

b) an alkylaluminum compound and, c) an electron-donor compound (external donor).

In some embodiments, in the catalyst component the content of Bi ranges from about 0.5 to about 40% wt, alternatively from about 1 to about 35, alternatively from about 2 to about 25% wt, alternatively from about 2 to about 20% wt, based upon the total weight of the solid catalyst component.

In some embodiments, the particles of the solid component have substantially spherical morphology and average diameter ranging between about 5 and about 150 alternatively from about 20 to about 100 alternatively from about 30 to about 90 In the present description, the term "substantially spherical morphology" as used herein refers to particles having the ratio between the greater axis and the smaller axis equal to or lower than about 1.5, alternatively lower than about 1.3.

In some embodiments, the amount of Mg ranges from about 8 to about 30%, alternatively from about 10 to about 25% wt, based upon the total weight of the solid catalyst component.

In some embodiments, the amount of Ti ranges from about 0.5 to about 5%, alternatively from about 0.7 to about 3% wt, based upon the total weight of the solid catalyst component.

In some embodiments, the internal electron donor compounds are selected from alkyl and aryl esters of optionally substituted aromatic polycarboxylic acids such as esters of benzoic and phthalic acids, In some embodiments, the esters are selected from the group consisting of n-butylphthalate, di-isobutylphthalate, di-n-octylphthalate, ethyl-benzoate and p-ethoxy ethyl-benzoate.

In some embodiments, the Mg/Ti molar ratio is equal to, or higher than, about 13, alternatively in the range from about 14 to about 40, alternatively from about 15 to about 40. In some embodiments, the Mg/donor molar ratio is higher than about 16, alternatively higher than about 17 and alternatively ranging from about 18 to about 50.

In some embodiments, the Bi atoms derive from one or more Bi compounds not having Bi-carbon bonds. In some embodiments, the Bi compounds are selected from the group consisting of Bi halides, Bi carbonate, Bi acetate, Bi nitrate, Bi oxide, Bi sulphate, and Bi sulfide. In some embodiments, the Bi compounds have valence 3$^+$. In some embodiments, the Bi compounds are selected from the group consisting of Bi trichloride and Bi tribromide. In some embodiments, the Bi compound is BiCl$_3$.

In some embodiments, the solid catalyst component is prepared by reacting a titanium compound of formula Ti(OR)$_{q-y}$X$_y$, where q is the valence of titanium and y is a number between 1 and q, with a magnesium chloride deriving from an adduct of formula MgCl$_2$.pROH, where p is a number between about 0.1 and about 6, alternatively from about 2 to about 3.5, and R is a hydrocarbon radical having 1-18 carbon atoms. In some embodiments, the titanium compound is TiCl$_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct thereby creating an emulsion which is quickly quenched causing the solidification of the adduct in form of spherical particles. In some embodiments, the procedure for the preparation of the spherical adducts are as disclosed in U.S. Pat. Nos. 4,399,054 and 4,469,648, both incorporated herein by reference. In some embodiments, the adduct is directly reacted with Ti compound or subjected to thermal controlled dealcoholation (80-130° C.), thereby obtaining an adduct in which the number of moles of alcohol is lower than about 3, alternatively between about 0.1 and about 2.5. In some embodiments, the reaction with the Ti compound is carried out by suspending the adduct (dealcoholated or as such) in cold TiCl$_4$; the mixture is heated up to 80-130° C. and kept at this temperature for 0.5-2 hours. In some embodiments, the temperature of the cold TiCl$_4$ is about 0° C. In some embodiments, the treatment with TiCl$_4$ can be carried out one or more times. In some embodiments, the electron donor compound is added during the treatment with TiCl$_4$.

Several ways are available to add one or more Bi compounds in the catalyst preparation. In some embodiments, a Bi compound is incorporated directly into the MgCl$_2$.pROH adduct during the adduct's preparation. In some embodiments, the Bi compound is added at the initial stage of adduct preparation by mixing the Bi compound together with MgCl$_2$ and the alcohol. In some embodiments, the Bi compound is added to the molten adduct before the emulsification step. The amount of Bi introduced ranges from about 0.1 to about 1 mole per mole of Mg in the adduct. In some embodiments, the Bi compounds which are incorporated directly into the MgCl$_2$.pROH adduct are Bi halides. In some embodiments, the Bi compound is BiCl$_3$.

In some embodiments, the alkyl-Al compound (ii) is selected from the group consisting of trialkyl aluminum compounds, alkylaluminum halides, alkylaluminum hydrides and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is a alkyl-aluminum sesquichlorides selected from the group consisting of AlEt$_2$Cl and Al$_2$Et$_3$Cl$_3$. In some embodiments, the alkyl-Al compound (ii) is a mixture including trialkylaluminums. In some embodiments, the Al/Ti ratio is higher than about 1, alternatively between about 50 and about 2000.

In some embodiments, the external electron-donor compounds are selected from the group consisting of silicon compounds, ethers, esters, amines, heterocyclic compounds and ketones. In some embodiments, the external electron-donor compound is 2,2,6,6-tetramethylpiperidine.

In some embodiments, the external donor compounds are silicon compounds of formula $(R_6)_a(R_7)_b Si(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. In some embodiments, the external electon-donor compounds are silicon compounds in which a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group. In some embodiments, $R_8$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)-(2-ethylpiperidinyl)-dimethoxysilane, and methyl(3,3,3-trifluoro-n-propyl)dimethoxysilane. In some embodiments, the external electon-donor compounds are silicon compounds in which a is 0, c is 3, $R_7$ is a branched alkyl or cycloalkyl group, optionally containing heteroatoms. In some embodiments, $R_8$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (iii) is used in an amount to give a molar ratio between the alkylaluminum compound (ii) and the electron donor compound (iii) of from about 0.1 to about 500, alternatively from about 1 to about 300 and alternatively from about 3 to about 100.

In some embodiments, the polymerization processes are carried out in gas-phase operating in one or more fluidized or mechanically agitated bed reactors, slurry polymerization using as diluent an inert hydrocarbon solvent, or bulk polymerization using the liquid monomer as a reaction medium. In some embodiments, the liquid monomer is propylene. In some embodiments, the polypropylene composition of the present disclosure is obtained with a polymerization process in two or more stages wherein component A) is obtained in a first stage and then component B) is obtained in a second stage in the presence of component A).

In some embodiments, the polymerization temperature ranges from about 20 to about 120° C., alternatively from about 40 to about 80° C. In some embodiments, when the polymerization is carried out in gas-phase, the operating pressure is between about 0.5 to about 5 MPa, alternatively between about 1 to about 4 MPa. In some embodiments, when the polymerization is carried out in bulk polymerization, the operating pressure ranges between about 1 to about 8 MPa, alternatively between about 1.5 to about 5 MPa. In some embodiments, hydrogen is used as a molecular weight regulator.

In some embodiments, the polypropylene compositions also contain additives. In some embodiments, the additives are selected from the group consisting of antioxidants, light stabilizers, heat stabilizers, nucleating agents, colorants and fillers.

In some embodiments, the automotive interior element is prepared by injection molding or thermoforming.

The following examples are given to better illustrate the disclosure without limiting it.

EXAMPLES

Determination of Mg, Ti

The determination of Mg and Ti content in the solid catalyst component was carried out via inductively coupled plasma emission spectroscopy on "I.C.P Spectrometer ARL Accuris".

The sample was prepared by analytically weighing, in a "Fluxy" platinum crucible", 0.1÷0.3 grams of catalyst and 2 grams of lithium metaborate/tetraborate 1/1 mixture. After addition of some drops of KI solution, the crucible was inserted in a "Claisse Fluxy" for the complete burning. The residue was collected with a 5% v/v $HNO_3$ solution and then analyzed via ICP at the following wavelengths: Magnesium, 279.08 nm and Titanium, 368.52 nm.

Determination of Bi

The determination of Bi content in the solid catalyst component was carried out via inductively coupled plasma emission spectroscopy on "I.C.P Spectrometer ARL Accuris".

The sample was prepared by analytically weighing in a 200 cm$^3$ volumetric flask 0.1÷0.3 grams of catalyst. After slow addition of both about 10 milliliters of 65% v/v $HNO_3$ solution and about 50 cm$^3$ of distilled water, the sample underwent a digestion for 4÷6 hours. Then the volumetric flask was diluted to the mark with deionized water. The resulting solution was directly analyzed via ICP at the following wavelength: Bismuth, 223.06 nm.

Determination of Internal Donor Content

The determination of the content of internal donor in the solid catalytic compound was done through gas chromatography. The solid component was dissolved in acetone, an internal standard was added, and a sample of the organic phase was analyzed in a gas chromatograph, to determine the amount of donor present at the starting catalyst compound.

Determination of X.I.

The Xylene Soluble fraction was measured according to ISO 16152, 2005, but with the following exceptions The solution volume was 200 ml.

During the precipitation stage at 25° C., the solution was for 30 min, without stirring.

The final drying step was done under vacuum at 100° C.

The content of the xylene-soluble fraction is expressed as a percentage of the original 2.5 grams and then, by difference (complementary to 100), the X.I. %

Intrinsic Viscosity (I.V.)

Determined in tetrahydronaphthalene at 135° C.

Molecular Weight Distribution (Mw/Mn)

Molecular weights and molecular weight distribution were measured at 150° C. using a Waters Alliance GPCV/2000 instrument equipped with four mixed-bed columns PLgel Olexis having a particle size of 13 μm. The dimensions of the columns were 300×7.8 mm. The mobile phase used was vacuum distilled 1,2,4-trichlorobenzene (TCB) and the flow rate was kept at 1.0 ml/min. The sample solution was prepared by heating the sample under stirring at 150° C. in TCB for one to two hours. The concentration was 1 mg/ml. To prevent degradation, 0.1 g/l of 2,6-di-tert-butyl-p-cresol were added. 300 μl (nominal value) of solution were injected into the column set. A calibration curve was obtained using 10 polystyrene standard samples (Easi- Cal kit by Agilent) with molecular weights in the range from 580 to 7 500 000. It was assumed that the K values of the Mark-Houwink relationship were:

$K=1.21\times10^{-4}$ dl/g and $\alpha=0.706$ for the polystyrene standards, $K=1.90\times10^{-4}$ dl/g and $\alpha=0.725$ for the experimental samples.

A third order polynomial fit was used to interpolate the experimental data and obtain the calibration curve. Data acquisition and processing was done by using Waters Empowers 3 Chromatography Data Software with GPC option.

Melt Flow Rate (MFR L)

The melt flow rate MFR L of the polymer was determined according to ISO 1133, condition L (230° C., 2.16 Kg).

$^{13}$C NMR of Propylene/Ethylene Copolymers $^{13}$C NMR spectra were acquired on a Balker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536, incorporated herein by reference) was used as internal reference at 29.9 ppm. The samples were dissolved in 1,1,2,2-tetrachloroethane-d2 at 120° C. with a 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made as described in "Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150, incorporated herein by reference, using the following equations:

$PPP=100T_{\beta\beta}/S$ $PPE=100T_{\beta\delta}/S$ $EPE=100T_{\delta\delta}/S$ $PEP=100S_{\beta\beta}/S$ $PEE=100S_{\beta\delta}/S$ $EEE=100(0.25S_{\gamma\delta}+0.5S_{\delta\delta})/S$ $S=T_{\beta\beta}+T_{\beta\delta}+T_{\delta\delta}+S_{\beta\beta}+S_{\beta\delta}+0.25S_{\gamma\delta}+0.5S_{\delta\delta}$ The molar percentage of ethylene content was evaluated using the following equation:

E % mol=100*[PEP+PEE+EEE]. The weight percentage of ethylene content was evaluated using the following equation:

$$r_1 r_2 = 1 + \left(\frac{EEE+PEE}{PEP}+1\right) - \left(\frac{P}{E}+1\right)\left(\frac{EEE+PEE}{PEP}+1\right)^{0.5}$$

where P % mol is the molar percentage of propylene content, while $MW_E$ and $MW_P$ are the molecular weights of ethylene and propylene, respectively.

The product of reactivity ratio $r_1 r_2$ was calculated according to C. J. Carman, R. A. Harrington and C. E. Wilkes, Macromolecules, 1977; 10, 536 as:

$$E\ \%\ \text{wt.} = \frac{100*E\ \%\ \text{mol}*MW_E}{E\ \%\ \text{mol}*MW_E + P\ \%\ \text{mol}*MW_P}$$

The tacticity of Propylene sequences was calculated as mm content from the ratio of the PPP $mmT_{\beta\beta}$ (28.90-29.65 ppm) and the whole $T_{\beta\beta}$ (29.80-28.37 ppm).

The ethylene content of component B) was calculated from the total ethylene content by using the formula: Ethylene(B wt %)=Ethylene(tot wt %)/(amount B wt %)/100)

Determination of the regioinversions: determined by means of $C^{13}$-NMR according to the methodology described by J. C. Randall in "Polymer sequence determination Carbon 13 NMR method", Academic Press 1977, incorporated herein by reference. The content of regioinversions was calculated on the basis of the relative concentration of $S_{\alpha\beta}+S_{\beta\beta}$ methylene sequences.

Melting Temperature Via Differential Scanning Calorimetry (DSC)

The melting points of the polymers (Tm) were measured by Differential Scanning calorimetry (D.S.C.) on a Perkin Elmer DSC-1 calorimeter, calibrated against indium melting points, and according to ISO 11357-1, 2009 and 11357-3, 2011, at 20° C./min. The weight of the samples in DSC crucibles was kept at 6.0±0.5 mg.

To obtain the melting point, the weighed sample was sealed into aluminum pans and heated to 200° C. at 20° C./minute. The sample was kept at 200° C. for 2 minutes, then cooled to 5° C. at 20° C./minute. After standing 2 minutes at 5° C., the sample was heated for the second run time to 200° C. at 20° C./min. In this second heating run, the peak temperature (Tp,m) was taken as the melting temperature.

Oligomer Content

The determination of oligomer content by solvent extraction consisted of treating 5 g of polypropylene sample with 10 ml of methylendichloride ($CH_2Cl_2$) in an ultrasonic bath at 25° C. for 4 hours. 1 μl of the extracted solution was injected into capillary column and analyzed by using FID, without any filtration. For quantitative estimation of oligomer content a calibration based on external standard method was applied. A series of hydrocarbon (C12-C22-C28-C40) was used.

Example 1

Procedure for the Preparation of the Spherical Adduct

Microspheroidal $MgCl_2.pC_2H_5OH$ adduct was prepared according to the method described in Comparative Example 5 of Patent Cooperation Treaty Publication No. WO98/44009, incorporated herein by reference, with the difference that $BiCl_3$ in a powder form and in the amount of 3 mol % with respect to the magnesium being added before feeding of the oil.

Procedure for the Preparation of the Solid Catalyst Component

Into a 500 ml round bottom flask, equipped with mechanical stirrer, cooler and thermometer 300 ml of $TiCl_4$ were introduced at room temperature under nitrogen atmosphere. After cooling to 0° C., while stirring, diisobutylphthalate and 9.0 g of the spherical adduct were sequentially added into the flask. The amount of charged internal donor was to meet a Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The solid was then dried under vacuum and analyzed.

Prepolymerization Treatment

Before introducing the solid catalyst component into the polymerization reactors, the solid catalyst component was contacted with triethyl aluminum (TEAL) and Dicyclopentyldimethoxysilane (DCPMS, D donor) in a ratio reported in Table 1. Then the resulting mixture was subjected to prepolymerization as reported in Table 1.

Polymerization

The polymerization run was carried out in continuous mode in a series of two reactors equipped with devices to transfer the product from a first reactor to a second reactor immediately next to the first reactor. The first reactor was a liquid phase loop reactor, and the second reactor was a fluidized bed gas-phase reactor. A propylene homopolymer was prepared in the liquid loop reactor while an propylene ethylene copolymer was prepared in the gas-phase reactor in the presence of the propylene homopolymer coming from the first reactor. Hydrogen is used as molecular weight regulator.

The gas phase (propylene, ethylene and hydrogen) was continuously analyzed via gas-chromatography.

At the end of the run the powder was discharged and dried under a nitrogen flow.

The main polymerization conditions and the analytical data relating to the polymers produced in the reactors are reported in Table 1. Properties of the polymer are reported in Table 2.

Comparative Example 2

Preparation of the Solid Catalyst Component

The catalyst of comparative example 2 was produced by using the same method used for preparing catalyst of example 1 but without using bismuth.

Prepolymerization Treatment

Prepolymerization treatment was carried out according to the procedure of example 1

Polymerization

The polymerization was carried out by using the same procedure of example 1. The main polymerization conditions and the analytical data relating to the polymers produced in the reactors are reported in Table 1. Properties of the polymer are reported in Table 2.

TABLE 1

| PROCESS CONDITIONS | Ex. 1 | Comp Ex. 2 |
|---|---|---|
| Precontact | | |
| Temperature ° C. | 15 | 15 |
| Residence time (min) | 24 | 24 |
| Teal/donor ratio | 4 | 4 |
| Prepolymerization | | |
| Temperature ° C. | 20 | 20 |
| Residence time (min) | 9 | 9 |
| Loop 1st reactor in liquid phase - propylene homopolymer | | |
| Temperature, ° C. | 80 | 80 |
| Pressure, bar | 18 | 18 |
| Residence time, min | 71 | 71 |
| H2/C3 mol/mol | 0.29 | 0.29 |
| Split, wt % | 70 | 70 |

TABLE 1-continued

| PROCESS CONDITIONS | Ex. 1 | Comp Ex. 2 |
|---|---|---|
| Gas-Phase reactor - ethylene/ propylene copolymerization | | |
| Temperature, ° C. | 70 | 70 |
| Pressure, bar | 16 | 16 |
| Residence time, min | 28 | 28 |
| H2/C3 mol/mol | 0.082 | 0.082 |
| H2/C2 mol/mol | 0.10 | 0.10 |
| C2/C2 + C3 mol/ mol | 0.45 | 0.45 |
| split wt % | 30 | 30 |

C2— = ethylene;
C3— = propylene;
H2 = hydrogen

TABLE 2

| Example | | comp ex 2 | ex 1 | Comp ex 3 |
|---|---|---|---|---|
| Component A) | | | | |
| Homopolymer content | % | 70 | 70 | 80 |
| MFR "L" | g/10' | 110 | 110 | 138 |
| Xylene soluble fraction | wt % | 2.0 | 1.0 | 2.2 |
| Component B) | | | | |
| Copolymer content | wt % | 30 | 30 | 20 |
| Ethylene content in component b) | wt % | 50 | 53 | 44 |
| Intrinsic viscosity of the Xylene soluble fraction | dl/g | 3.17 | 3.00 | 3.20 |
| Property of the composition | | | | |
| Xylene -soluble fraction | wt % | 27.3 | 29.0 | 19 |
| MFR | g/10' | 15.2 | 17.7 | 55 |
| Flexural Modulus | MPa | 1000 | 950 | 1450 |
| melting point | ° C. | 164.1. | 164.5 | |
| Oligomer content | ppm | 3115 | 1475 | 3190 |

Comparative example 3 was prepared to the description of example 1 of Patent Cooperation Treaty No. WO 2012/049204, incorporated herein.

What is claimed is:

1. A polypropylene composition comprising:
A) from about 50 wt % to about 90 wt %; of a propylene homopolymer having a fraction insoluble in xylene at 25° C., higher than 90%; and a MFR L (Melt Flow Rate according to ISO 1133, condition L, at 230° C. and 2.16 kg load) from about 0.5 to about 200 g/10 min;
B) from about 10 wt % to about 50 wt %; of a copolymer of propylene and ethylene having from about 30.0 wt % to about 70.0 wt %, of ethylene derived units, based upon the total weight of the copolymer;
the sum of the amount of component A) and B) being 100;
the polypropylene composition having:
i) an intrinsic viscosity of the fraction soluble in xylene at 25° C. between about 2.2 to about 4.0 dl/g;
ii) a MFR L (Melt Flow Rate according to ISO 1133, condition L, at 230° C. and 2.16 kg load) from about 0.5 to about 100 g/10 min;
iii) a xylene soluble fraction ranging from about 25 wt % to about 50 wt %, based upon the total weight of the polypropylene composition;
wherein the polypropylene composition being obtained by a polymerization process comprising the steps of:
step a) polymerizing propylene to obtain component A) in the presence of a catalyst comprising the product of a reaction between:

a) a solid catalyst component comprising Ti, Mg, Cl, and an internal electron donor compound containing from about 0.1 to about 50% wt of Bi with respect to the total weight of the solid catalyst component;
b) an alkylaluminum compound and,
c) an electron-donor compound (external donor); and
step b) polymerizing propylene and ethylene to obtain component B) in the presence of the polymerization product of step a).

2. The polypropylene composition according to claim 1 wherein component A) ranges from about 60 wt % to about 85 wt %; and component B) ranges from about 15 wt % to about 40 wt %.

3. The polypropylene composition according to claim 1 wherein component B) contains from about 35.0 wt % to about 60.0 wt % of ethylene derived units, based upon the total weight of the copolymer.

4. The polypropylene composition according to claim 1, having MFR L (Melt Flow Rate according to ISO 1133, condition L, at 230° C. and 2.16 kg load) of the polypropylene composition in the range from about 8 to about 70 g/10 min.

5. The polypropylene composition according to claim 1, having the xylene soluble fraction of the polypropylene composition in the range from about 25 wt % to about 35 wt %, based upon the total weight of the polypropylene composition.

6. An automotive interior element comprising:
a polypropylene composition comprising
A) from about 50 wt % to about 90 wt %; of a propylene homopolymer having a fraction insoluble in xylene at 25° C., higher than 90%; and a MFR L (Melt Flow Rate according to ISO 1133, condition L, at 230° C. and 2.16 kg load) from about 0.5 to about 200 g/10 min;
B) from about 10 wt % to about 50 wt %; of a copolymer of propylene and ethylene having from about 30.0 wt % to about 70.0 wt %, of ethylene derived units, based upon the total weight of the copolymer;
the sum of the amount of component A) and B) being 100;
the polypropylene composition having:
  i) an intrinsic viscosity of the fraction soluble in xylene at 25° C. between about 2.2 to about 4.0 dl/g;
  ii) a MFR L (Melt Flow Rate according to ISO 1133, condition L, at 230° C. and 2.16 kg load) from about 0.5 to about 100 g/10 min;
  iii) a xylene soluble fraction ranging from about 25 wt % to about 50 wt %, based upon the total weight of the polypropylene composition;
wherein the polypropylene composition being obtained by a polymerization process comprising the steps of:
step a) polymerizing propylene to obtain component A) in the presence of a catalyst comprising the product of a reaction between:
  a) a solid catalyst component comprising Ti, Mg, Cl, and an internal electron donor compound containing from about 0.1 to about 50% wt of Bi with respect to the total weight of the solid catalyst component;
  b) an alkylaluminum compound and,
  c) an electron-donor compound (external donor); and
step b) polymerizing propylene and ethylene to obtain component B) in the presence of the polymerization product of step a).

* * * * *

UNITED STATES PATENT AND TRADEMARK OFFICE
CERTIFICATE OF CORRECTION

PATENT NO. : 10,316,122 B2
APPLICATION NO. : 15/768875
DATED : June 11, 2019
INVENTOR(S) : Massari et al.

It is certified that error appears in the above-identified patent and that said Letters Patent is hereby corrected as shown below:

In the Specification

In Column 2, Line 19, after "33 wt%," delete -- %; --
In Column 3, Line 40, after "5 and about 150" insert -- μm --
In Column 3, Line 41, after "20 to about 100" insert -- μm --
In Column 3, Line 42, after "30 to about 90" insert -- μm --
In Column 6, Line 44, after "exceptions" insert -- . --

In the Claims

In Column 11, Claim 2, Line 10, after "Claim 1" insert -- , --
In Column 11, Claim 3, Line 14, after "Claim 1" insert -- , --

Signed and Sealed this
Twenty-first Day of June, 2022

Katherine Kelly Vidal
*Director of the United States Patent and Trademark Office*